United States Patent [19]

McDaniel et al.

[11] 4,441,258

[45] Apr. 10, 1984

[54] CODED TAPE FOR DETERMINING TIRE SIZE

[75] Inventors: Charles R. McDaniel, Wadsworth, Ohio; H. Richard Baumgardner, Prospect, Ky.

[73] Assignee: The Firestone Tire & Rubber Company, Akron, Ohio

[21] Appl. No.: 510,697

[22] Filed: Jul. 5, 1983

[51] Int. Cl.³ .............................................. G01B 3/10
[52] U.S. Cl. .................................... 33/179; 33/137 R
[58] Field of Search ................ 33/179, 137 R, 137 L, 33/176, 143 D

[56] References Cited

U.S. PATENT DOCUMENTS

| | | | |
|---|---|---|---|
| 1,339,896 | 5/1920 | Kemper | 33/179 |
| 1,432,605 | 10/1922 | Lawrence | 33/179 |
| 1,797,389 | 3/1931 | Woock | 33/179 |
| 1,857,523 | 5/1932 | Wittel | 33/179 |
| 1,962,716 | 6/1934 | Johnson | 33/179 |
| 2,434,156 | 1/1948 | Heintz | 154/14 |
| 3,007,251 | 11/1961 | Rawls | 33/178 |
| 3,292,261 | 12/1966 | Hayes | 33/179 |
| 3,633,279 | 1/1972 | Frezlev et al. | 33/174 R |
| 3,685,155 | 8/1972 | Oblander | 33/11 |
| 3,986,267 | 10/1976 | Taylor | 33/143 D |

FOREIGN PATENT DOCUMENTS

| | | | |
|---|---|---|---|
| 78911 | 2/1955 | Denmark | 33/179 |
| 917272 | 8/1954 | Fed. Rep. of Germany | |

OTHER PUBLICATIONS

Tire Review, Apr. 1983, pp. 44-46; Dick Baumgardner, "Designing a retread plant the way I'd like to see it".
Firestone—Retread Shop Manual—p. 16—Buffing-Tire Matrix Selection—Rev. 5-82.

*Primary Examiner*—Willis Little
*Attorney, Agent, or Firm*—Ernst H. Ruf

[57] ABSTRACT

In a measuring device for tires, wherein the device comprises a length of flexible tape adapted to overlap an annular portion of the outer peripheral surface of a tire, the improvement comprises the addition to the outer surface of the tape of a plurality of circumferentially extending discrete bands, identifiable via individual codes marked thereon consisting of other than physical dimensions, for determination of the sizes of the tires.

10 Claims, 6 Drawing Figures

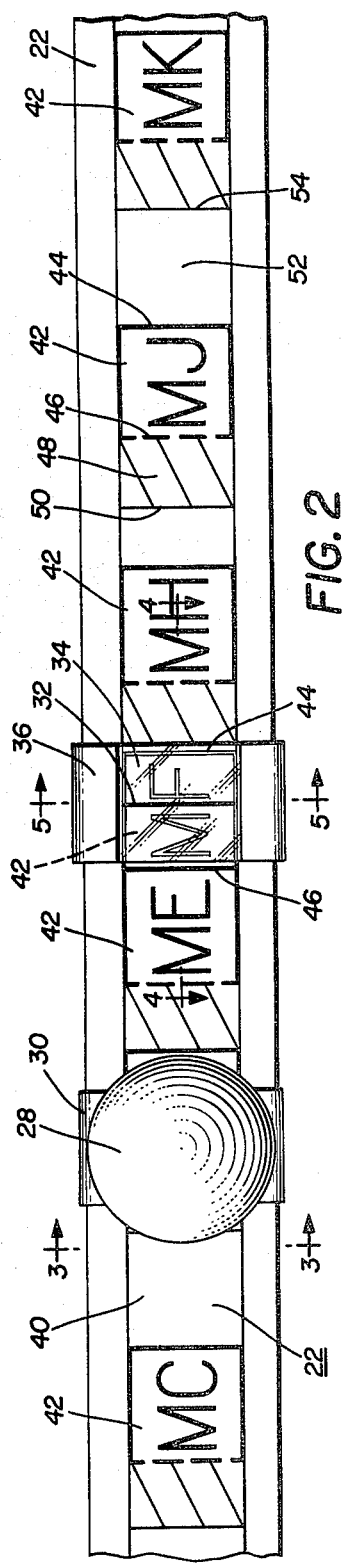
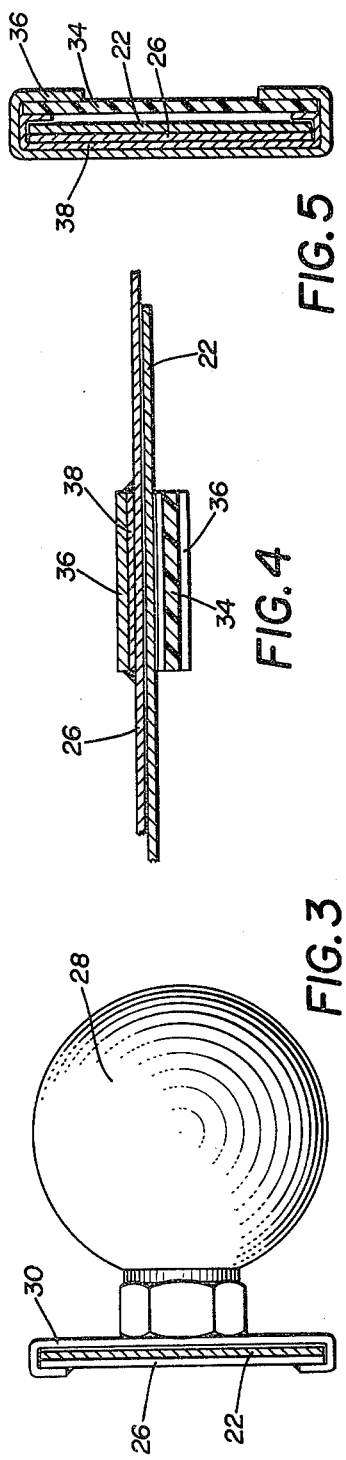
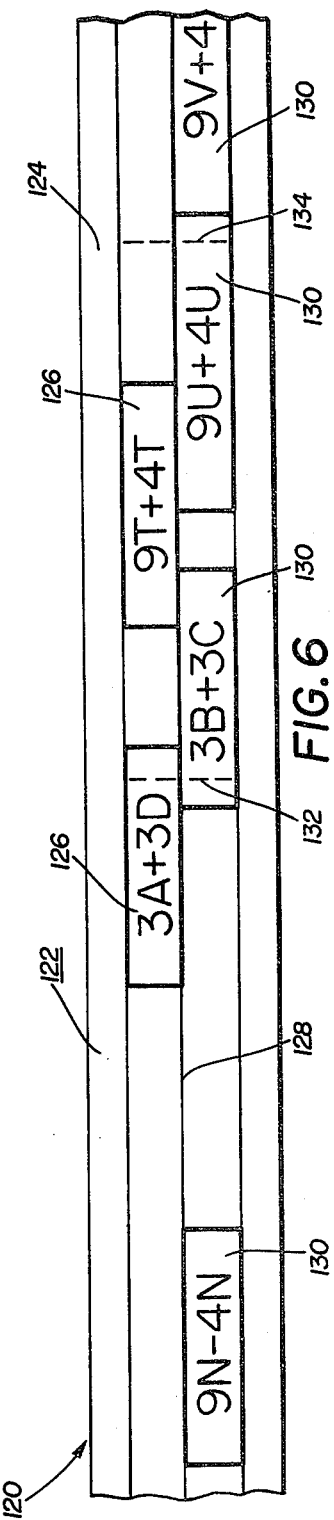

CODED TAPE FOR DETERMINING TIRE SIZE

TECHNICAL FIELD

The field of art to which this invention pertains is that of pneumatic tires, particularly to the use of a measuring tape adapted to circumferentially surround and overlap an annular portion of the outer peripheral surface of the tire for determining the size thereof.

BACKGROUND OF THE ART

Tire dimensions are important, particularly tire diameters. For example, tires should be matched, in terms of diameter when mounting them in dual wheel applications, such as on heavy duty trucks, where matched tire sizing is required for load carrying purposes, etc. In addition, in retreading operations it is important to determine the exact tire dimensions, particularly in minimum and maximum diameters of buffed tire casings in order to select the proper matrix for retreading purposes. One way to measure the buffed diameter of a tire casing is to pull a band tightly around the center of the casing and then reading the physical dimension of the tire, generally in vernier scale calibration, in terms of either circumference or, if so calibrated, directly in diameter. It is better practice to measure the circumference of the tire and then calculate the diameter therefrom since a direct diameter measurement of the tire is more complicated due to tire contour and is often not fully accurate due to out-of-round conditions of the tire casing. Once the correct physical dimension is determined, the operator then must consult a separate maintenance chart in order to select the proper matrix. This is not only time consuming, but also can lead to errors in selecting the proper chart to determine the proper matrix.

U.S. Pat. No. 1,797,389 to Woock discloses a measuring tape which is specifically designed and adapted for measuring the exterior cross-sectional peiphery or cross-sectional profile of an automobile tire. However, the tape is not calibrated in matrix code, is not oriented to be circumferentially placed around the tire and does not appear to be specifically used for determining matrix sizes. German Pat. No. 917,272 to Zangl appears to disclose a tire measuring tape somewhat similar to that shown by Woock. There appears to be no indication in regard to tape calibrations.

U.S. Pat. No. 2,434,156 to Heintz discloses a method and device for retreading tires wherein a tape (not shown) is placed along line 3 such that the buffed contour of the tire from bead-to-bead is measured. The dimensions of the tire are then compared to a table, as shown in FIGS. 5 and 8, whereupon the appropriate size matrix is chosen for retreading the tire.

U.S. Pat. No. 3,007,251 to Rawls discloses a method and apparatus for measuring tire casings, both of which differ from that of the present invention inasmuch as they are used to measure cross-sectional contour and the cross-sectional dimension. In addition, the matrix appears to be based on the measured bead-to-bead dimension.

U.S. Pat. No. 3,633,279 to Frezlev et al discloses an apparatus for measuring tire parameters of the tire carcass, which apparatus however does not disclose the use of circumferentially displaced tape or a calibrated scale which indicates matrix dimensions.

U.S. Pat. No. 3,986,267 to Taylor discloses a tire measuring instrument for the diameter and bead-to-bead dimension of a tire casing and correlating such measurement to a particular retreading matrix. The mechanism in question appears to measure the cross-sectional periphery of the tire as well as its diameter, but not the circumferential periphery. In addition, Taylor does not disclose a calibrated tape which is used to indicate matrix dimensions.

U.S. Pat. No. 1,962,716 to Johnson discloses a spring wire gauge for measuring the treads of flanged wheels that are primarily used on railway stock. Johnson however neither describes the form of calibrations on his measuring plate nor illustrates a measuring device oriented specifically to tires.

U.S. Pat. No. 3,685,155 to Oblander discloses a sewing measurement device comprising a coded tape which is used to fit different parts of a person's body in order to determine body dimensions for sewing parameters. Each area of the strip has different indicia relating to particular body dimensions and these areas may be color coded to indicate particular deviations.

DISCLOSURE OF THE INVENTION

The present invention provides a solution to the prior art porblems pertaining to initially measuring the dimension of a tire and then comparing same to a table, whereupon the appropriate size matrix is chosen for retreading the tire. A known measuring device, comprising a length of flexible tape, is placed so as to circumferentially surround and overlap an annular portion of the outer peripheral surface or largest circumference of the tire. The present invention pertains to an improved measuring device wherein the outer surface of the tape is provided with a plurality of circumferentially extending discrete bounded markings, identifiable via individual codes consisting of other than physical dimensions, for determining the sizes of the tires. As will become more apparent, this improved measuring device may be used on new tires, worn tire casings, buffed tire casings, built-up tire casings prior to curing, and cured retreaded tires, for example.

In terms of retreading operations, the plurality of codes preferably takes the form of matrix codes corresponding to a plurality of matrices or molds used in the curing of retreaded tires. Preferably each of the matrix codes corresponds to the working tolerance of its corresponding matrix, but may also include an undersize and/or oversize tolerance range.

In terms of the matrix codes themselves, they may represent a tolerance range in terms of either tire diameter and/or tire circumference and furthermore, the improved measuring device of the present invention may also include the use of more than one plurality of differing circumferentially extending codes on one tape.

The use of matrix codes directly on the measuring tape surface saves time and expense by providing a simple means of enabling the direct determination of matrices for the curing of tires inasmuch as matrix codes rather than direct physical dimensions are shown on the tapes. The matrix code can thus be read directly from the tape thereby eliminating the need to determine a physical dimension which in turn then needs to be compared with a separate reference chart in order to select the proper matrix.

Several preferred non-limiting embodiments are shown by way of example in the accompanying drawings and described in detail without attempting to show all the various forms or modifications in which the present invention may be embodied. The features and advantages of the present invention will become more readily understood by persons skilled in the art when following the best made description in conjunction with the several drawings.

BRIEF DESCRIPTION OF THE DRAWINGS

FIG. 2 is an enlarged plan view of the overlapping portions of the coded tape depicted in FIG. 1.

FIG. 3 is an enlarged vertical cross-sectional view taken substantially on the plane indicated by lines 3—3 of FIG. 2.

FIG. 4 is a fragmentary horizontal cross-sectional view taken substantially on the plane indicated by lines 4—4 of FIG. 2.

FIG. 5 is a vertical cross-sectional view taken substantially on the plane indicated by lines 5—5 of FIG. 2.

FIG. 6 is a fragmentary plan view of a portion of a further embodiment of the coded tape of the present invention.

BEST MODE FOR CARRYING OUT THE INVENTION

Figure 1:
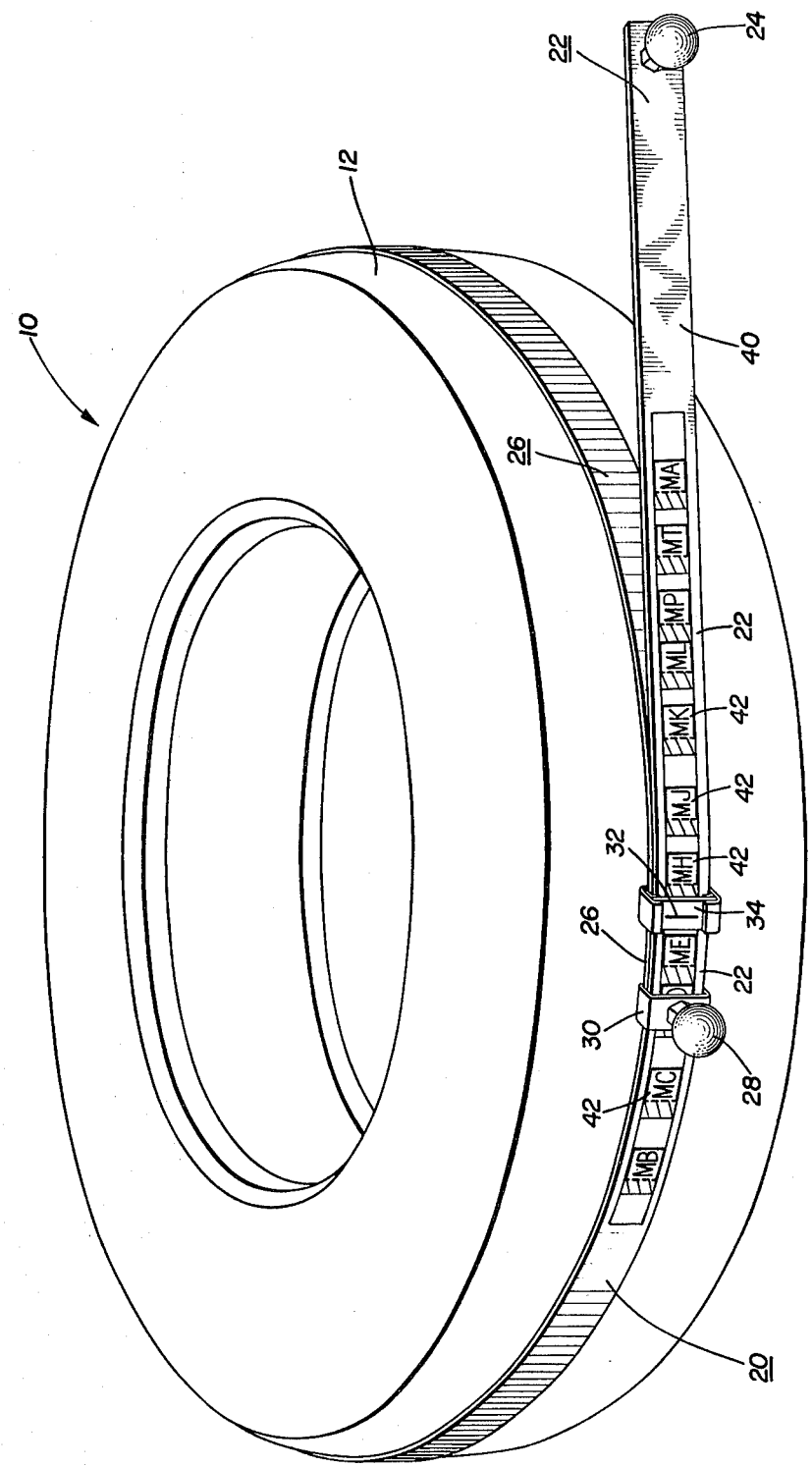
FIG. 1 is a perspective view of a tire whose circumferential peripheral surface is enveloped by the coded tape of the present invention.

Referring now to the drawings, specifically FIG. 1, there is illustrated a perspective view of a tire 10, at least an annular central portion of whose circumferential outer peripheral surface 12 is enveloped by the coded tape 20 of the present invention. The shape, profile, actual construction, size or material composition of tire 10 form no part of the present invention. Tire 10 may be of any desired construction, be it bias, bias belted or radial, all of which constructions are well-known in the art. For example, the construction (not shown) of a conventional radial tire, which is described herein merely for reference and background purposes, may consist of one or more radial body plies preferably extending from bead-to-bead and consisting of a fabric material such as rayon, topped by two tread plies or belts of reinforcing material, such as for example of steel cord construction, with these tread plies in turn being topped by a circumferential tread portion of suitable rubber-based composition and tread design which is the actual road-contacting portion of the tire.

The term "casing" of a tire or phrase "tire body" are generally used with reference to a used or worn tire whose remaining tread will be removed and whose crown and shoulder areas will be shaped, as needed, to conform to a predetermined size and shape for retreading. Such removal is normally accomplished via a buffing operation in a manner well-known in the art.

Suffice to say, surface 12 may be that of a new tire, i.e. provided with a full depth tread surface (not shown), a tire with a worn tread surface (not shown), a tire whose worn tread has been buffed to the casing or, surface 12 may be provided with a fresh rubber prior to the curing step in a retreading process, for example.

Among other uses, coded tape 20 of the present invention also finds utility in determining tire size in retreading operations. In retreading, generally each particular tire size requires its own specific matrix or mold which is used for curing the retreaded casing into its desired size and tread design configuration. For example, the primary method for fitting radial tire casings into matrices requires exact buffed dimension measurements together with, to a lesser extent, crown and bead-to-bead measurements. Assuming now, for discussion purposes, that tire 10 takes the form of a buffed casing, the buffed dimension thereof could be measured with coded tape 20 by pulling same tightly around the center of casing outer circumferential surface 12.

Coded tape 20 may be of spring or flexible steel construction, preferably about 1.25 inches in width, and is, of course, of sufficient length to be used in connection with most tire sizes. In order to facilitate the handling of tape 20, the outer end portion 22 may be provided with a hand knob 24, directly secured thereto whereas the inner end portion 26 may be provided with a further hand knob 28 that is attached thereto via a contoured retaining bracket 30 which also permits tape end portion 22 to pass therethrough and slide relative to tape end portion 26, as best seen in FIG. 3.

For actual measuring purposes, the zero or innermost end portion of tape 20 may be defined by slight line 32 on transparent window 34 held, via a further contoured bracket 36, relative to band inner end portion 26 as best shown in FIG. 4. FIG. 5 also shows the use of inner bracket 38 which, similar to bracket 30, partially encircles tape portions 22 and 26 while yet permitting relative transverse sliding motion therebetween. It should be noted that the specific shape, construction and material composition of coded tape 12 forms no part of the present invention and preceding description is but for disclosure and enablement purposes.

At least a portion of the annular outer surface 40 of tape end portion 22 is provided with a plurality of matrix codes 42 at specific locations in a vernier or linear range or scale, with each matrix code defining a band or range of dimensions of buffed tires that fit within a particular matrix. For example, as shown in FIG. 2, sight line 32 falls between lines 44 and 46, which define the upper and lower limit, respectively, of the range of tire casing dimensions usable with a matrix or mold denominated by symbols MF. Looking at it another way, the range between lines 44 and 46 (matrix MF) defines the working tolerance asssociated with the matrix, i.e. the maximum and minimum dimensions of buffed casings usable in that particular matrix without further changes.

Looking now at matrix MJ in FIG. 2, the range between line 44 and 46 again represents the working tolerance of the matrix. The range or band 48 defined between low limit line 46 and undersize limit line 50 defines the undersize tolerance of matrix MJ. If, for example, sight line 32 were to fall within band 48, the tire casing will have to be built up a predetermined amount sufficient so its built-up dimensions fall within the working tolerance of matrix MJ. If on the other hand, for instance, sight line 32 were to fall into band 52, between upper limit line 44 of matrix MJ and undersize limit line 54 of matrix MK, the casing cannot be used in either matrix MJ (since it is too small, i.e., the casing is too large) or in the next tire larger matrix MK (since it is too large, i.e., the casing is too small).

Turning now to FIG. 6, it takes the form of a fragmentary plan view of a portion of a further embodiment of the coded tape of the present invention. Specifically FIG. 6 depicts a segment of outer end portion 122 of a coded tape 120 where outer surface 124 is provided with two transversely adjacent, but different pluralities of circumferentially extending matrix codes 126, 130, separated by circumferential centerline 120. For example, letting broken line 132 represent an imaginary sight line, it should be evident that the tire casing would fit into any one of the four matrices, i.e., matrices 3A and 3D of matrix codes 126 as well as matrices 3B and 3C of matrix codes 130. On the other hand, the location of imaginary sight line 134 indicates that the tire casing will only fit into matrices 9U and 4U of matrix codes 130. Matrix codes 126 and 130 may represent two different lines of molds for two different lines of tires. For example, code 126 may be utilized for all-season type tires whereas code 130 may be used for snow tires. If desired, additional matrix codes could be added to coded tape 120, if compatible.

At this point it should be evident that the use of one or more pluralities of circumferentially extending matrix codes, such as 42 in FIGS. 1 and 2 as well as 126 and 130 in FIG. 6, save time and expense by providing a simple means of enabling direct determination of matrices for the curing of tires. Basically, matrix codes rather than physical dimensions are shown on tapes 220 (FIG. 1) and 120 (FIG. 6). Thus, the matrix code, by being provided on the tape itself, can be read directly from the tape thereby eliminating the need to determine a physical dimension which in turn then needs to be compared to a separate reference chart in order to select the proper matrix. The system of matrix codes, provided directly on the measuring tape, may of course utilize any type of desired indicia, be it numerals, letters, differing colors, etc., as long as they are provided at specific locations on a measuring tape and occupy a linear range defined for each matrix.

From the foregoing, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the scope and spirit of the invention, with the scope thereof being determined solely by reference to the claims appended hereto.

What is claimed is:

1. A measuring device for a tire, said device comprising a length of flexible tape having two ends and being adapted to circumferentially surround and overlap an annular portion of the outer peripheral surface of a tire, said device including means for adjusting said tape to said annular portion, the improvement comprising a plurality of transversely extending discrete bands located adjacent to one end of an outer surface of said tape, each of said discrete bands having an individual code marked thereon, each of said codes comprising an individual matrix code corresponding to a physical dimension of one of a plurality of matrices or molds used in the curing of new or retreaded tires, said matrix codes being arranged on said tape such that said codes represent decreasing mold dimensions in a direction away from said one end, said bands and said codes together comprising means for determining the appropriate matrix or mold in which a tire is to be positioned for curing by direct visual inspection of said tape when said tape surrounds said annular portion.

2. The improved measuring device of claim 1 wherein said tires are one of new tires, worn tire casings, buffed tire casings, built-up tire casings prior to curing, and cured retreaded tires.

3. The improved measuring device of claim 2 wherein each of said plurality of matrix codes corresponds to the working tolerance associated with its corresponding matrix.

4. The improved measuring device of claim 3 wherein at least some of said matrix codes also include at least one of an undersize and oversize tolerance range.

5. The improved measuring device of claim 2 including at least two pluralities of differing circumferentially extending codes.

6. The improved measuring device of claim 1 wherein said codes represent a tolerance range in terms of tire diameter.

7. The improved measuring device of claim 1 wherein said codes represent a tolerance range in terms of tire circumference.

8. The improved measuring device of claim 1 wherein said tape adjusting means comprises a first hand knob attached to said tape and a second hand knob attached to said tape via a retaining bracket in which said tape is adapted to slide.

9. The improved measuring device of claim 1 further comprising a transparent window attached to said tape by a contoured bracket, said transparent window having a sight line thereon which is generally parallel to said discrete bands.

10. A method of selecting the matrix or mold in which to cure a tire casing, without the need for directly determining any physical dimension of said tire casing, said method involving the use of a flexible tape having first and second ends and a length sufficient to surround an annular portion of the outer peripheral surface of said tire casing, said tape having means for adjusting said tape to the dimensions of a given annular casing portion, and a plurality of discrete bands extending transversely to the length of said tape, each of said bands being bounded by parallel lines and having an individual matrix code marked thereon, each of said matrix codes corresponding to a matrix or mold used for said curing of said casing, said matrix codes being arranged on said tape adjacent said first end such that said codes represent decreasing mold dimensions in a direction away from said first end, said method comprising:
   (a) positioning said tape about an annular portion of the outer peripheral surface of said tire such that the ends of said tape overlap;
   (b) reading a matrix code directly from said tape at the point at which said tape band overlaps said second tape end; and
   (c) selecting a mold or matrix into which the tire is to be placed for curing in accordance with the matrix code read at said point.

* * * * *